2 Sheets—Sheet 1.
H. B. STEVENS.
Grain-Separator.
No. 199,233. Patented Jan. 15, 1878.
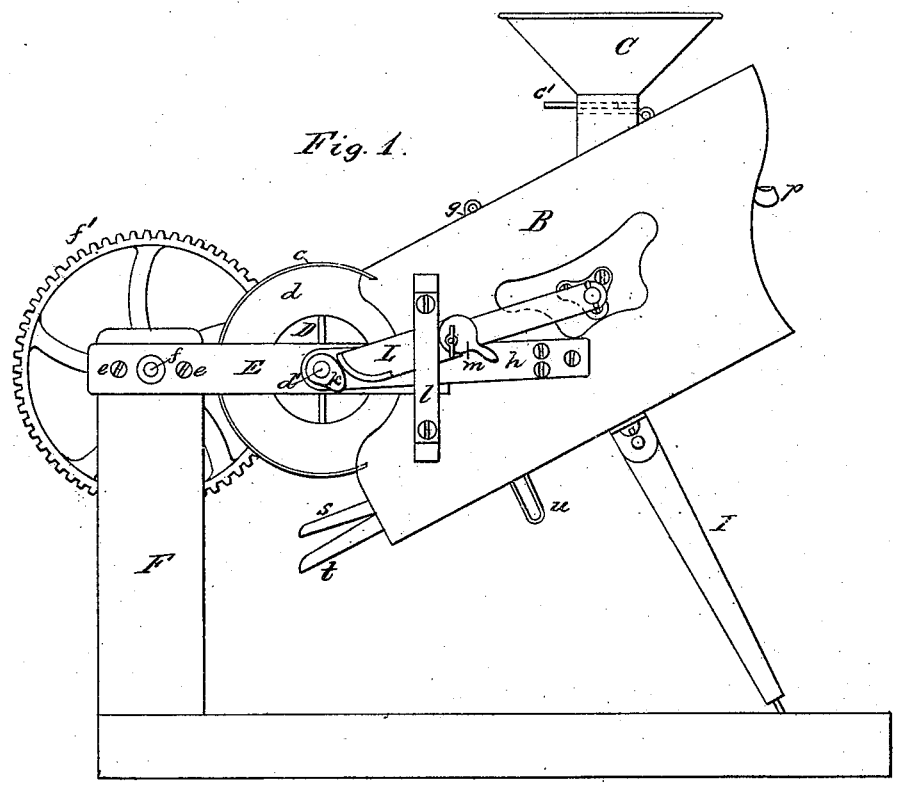
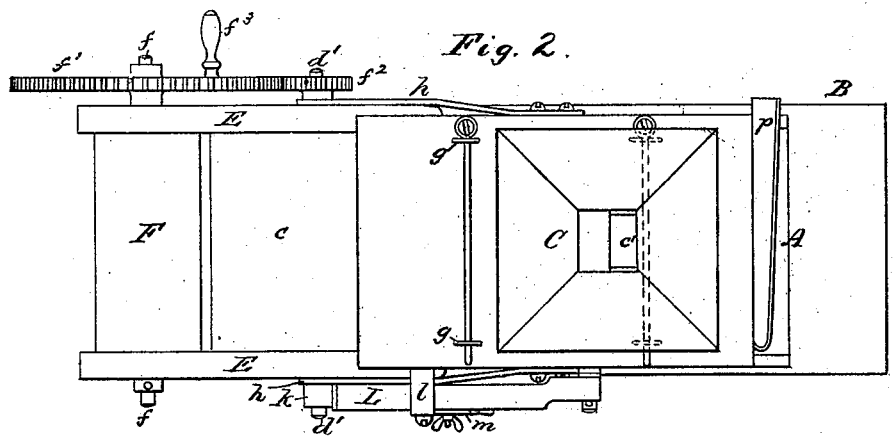

2 Sheets—Sheet 2.
H. B. STEVENS.
Grain-Separator.
No. 199,233. Patented Jan. 15, 1878.
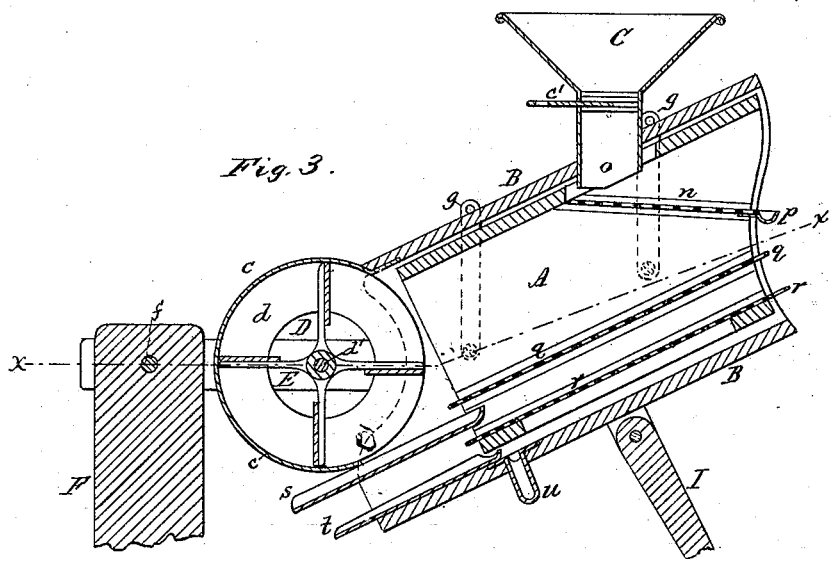
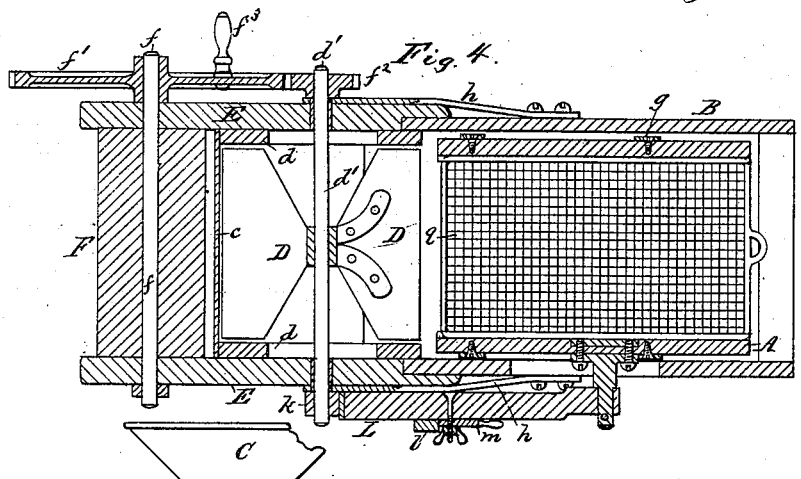
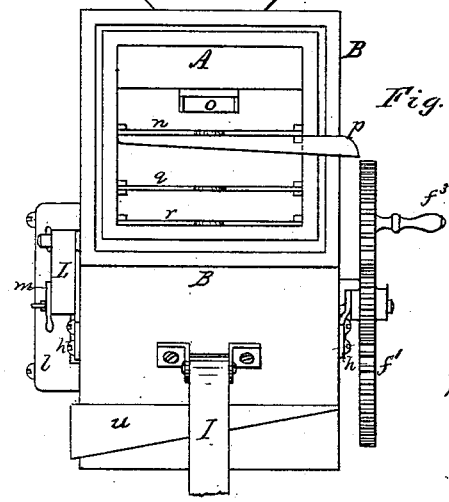
Inventor
Henry B. Stevens
by Wilhelm & Bonner
Attorneys
Witnesses

UNITED STATES PATENT OFFICE.

HENRY B. STEVENS, OF BUFFALO, NEW YORK, ASSIGNOR TO GEORGE L. SQUIER, OF SAME PLACE.

IMPROVEMENT IN GRAIN-SEPARATORS.

Specification forming part of Letters Patent No. 199,233, dated January 15, 1878; application filed November 15, 1877.

*To all whom it may concern:*

Be it known that I, HENRY B. STEVENS, of the city of Buffalo, in the county of Erie and State of New York, have invented new and useful Improvements in Machines for Separating and Cleaning Coffee and other grains, of which the following is a specification, reference being had to the accompanying drawings.

The object of this invention is to produce a simple, compact, and cheap machine for separating and cleaning coffee and other grains and seeds, which is especially adapted to be actuated by hand or other light power, and which can be readily transported and set up ready for work in the localities where coffee or other grains and seeds are grown, and which can be nicely adjusted to adapt it to the cleaning and separating of grain of various sizes and conditions.

The nature of my invention will fully appear from the following description.

In the accompanying drawings, consisting of two sheets, Figure 1 is a side elevation of my improved separator. Fig. 2 is top-plan view, and Fig. 3 a vertical section, thereof. Fig. 4 is a horizontal section in line $x\ x$, Fig. 3. Fig. 5 is a rear-end view of the separator.

Like letters of reference designate like parts in each of the figures.

A represents the shaking-shoe; B, a case or trunk inclosing the same, and made open at both ends; C, the feed-hopper, and D the fan. $c$ represents the scroll of the fan-case, and $d\ d$ the side pieces, made separate from the scroll, and secured rigidly to two parallel arms or bars, E E, in which the shaft $d'$ of the fan is supported or journaled.

$f$ is the driving-shaft, supported in the outer ends of the arms E E, and connected with the fan-shaft $d'$ by means of two gear-wheels, $f^1\ f^2$, or in any other suitable manner. $f^3$ is a hand-crank for applying power to the shaft $f$ when the machine is to be operated by hand.

The arms E E are arranged at such a distance apart that they will straddle a post, tree-stump, or other support, F, of suitable size, to which they are secured by screws $e$. As shown in the drawings, the driving-shaft $f$ runs through the support F, in which a hole has to be drilled for the reception of the shaft; but, if preferred, the arms E may be made sufficiently long to accommodate the support F in the space between the fan-case and the shaft $f$.

$g\ g$ are hangers or straps, secured with their upper ends to the case B, and with their lower ends to the shoe A, so as to enable the latter to vibrate longitudinally in the case B. $h\ h$ are two straps rigidly secured to the sides of the case B, and hung on boxes on the fan-shaft $d'$, so that by raising and lowering the outer or rear end of the case B the latter will swing on the boxes of the fan-shaft, or turn concentric therewith.

The scroll $c$ of the fan-case is secured with its ends to the case B, and turns on the side pieces $d$ of the fan-case in raising and lowering the case B, whereby the discharge-opening of the fan-case is caused to remain in the same relative position to the case B and shaking-shoe A in all positions of the case. I is a leg or support pivoted to the under side of the case B, for supporting the same at any desired inclination.

$k$ is a cam or knocker mounted on the end of the fan-shaft $d'$, so as to strike against the forward end of an arm or rod, L, which is pivoted with the rear end to the shoe A, so as to shake or vibrate the latter longitudinally. $l$ is a guide-piece secured to the side of the case B, for supporting the forward end of the rod L in its proper position. $m$ is an adjustable eccentric stop pivoted to the rod L near the guide-piece $l$, so as to strike against the latter, thereby limiting the stroke of the rod L and shaking-shoe A. By turning the stop $m$ on its pivot, and securing it in place by its set-screw, the stroke of the rod L can be increased or lessened. The cam $k$, striking the shoe on one side, gives the screens a sidewise or twisting jar which materially assists in dislodging any grains which may have become fast in the meshes.

$n$ is a preliminary screen or riddle, provided with elongated rectangular openings and arranged underneath the feed-spout $o$, so that the hulled grains will pass through the meshes of the screen, while the unhulled grains are discharged over the tail end of the screen into a discharge-spout, *p*, at the rear of the machine. *q* and *r* represent two inclined screens arranged in the shoe A parallel with the bottom thereof, or nearly so.

The grains, passing through the preliminary screen *n*, are separated by the upper screen *q* into two sizes, the larger passing over the tail end of the screen into a spout, *s*, while the smaller grains pass through the meshes of the screen and fall upon the screen *r* having a finer mesh, through which the very small and broken grains pass, while the larger grains pass over the tail end of the screen into a spout, *t*.

It is obvious that any desired number of screens may be employed in the shoe A. The material falling upon the bottom of the shoe is discharged by a spout, *u*. The screens *n*, *q*, and *r* are arranged in ways in the shoe, so as to be readily removable for the purpose of cleaning them.

The chaff and dust are blown away by the air-current, and the grain is separated according to its size into three or more grades, each being conducted by a spout to a suitable receptacle.

The grain to be separated is placed in the hopper C, and the quantity of the feed is regulated by the slide $c'$. By turning the crank $f^3$ motion is applied to the fan, whereby an air-current is forced through the shoe A, over the screens *q r*, and through the screen *n*. The revolving cam *k* gives a sharp quick stroke to the arm L, thereby jarring the shoe A and the screens arranged therein, the degree of the jar being regulated by the adjustable stop *m*. For ordinary work a very slight stroke is sufficient; but if the grain is of such a nature as to have a tendency to choke the screens, or if the feed is not fast enough, or if too small a quantity of grain goes into the second quality, this can be remedied by increasing the stroke of the arm L. If it should be found that with the longest possible stroke of the arm L the screens should become clogged, or that some of the light grain is blown over with the chaff, or that too much of the grain goes into the second quality, these difficulties can be remedied by elevating the trunk B by means of the leg I.

In this manner my improved machine is readily adapted to the cleaning and separating of a great variety of grains, which is of the greatest importance in a machine designed to operate principally upon coffee, as coffee varies greatly in size, shape, and condition, not only in different countries, but also in the same district or on the same plantation, these properties of the coffee depending upon the varieties grown, the mode of cultivation, time of harvest, method of cure, &c.

My improved machine is complete without any of the usual frame-work, as the post or support F does not form a part of the machine.

By this construction the machine is materially cheapened in the cost of manufacture, and its bulk and weight are reduced, thereby facilitating and cheapening the transportation of the machine to distant countries, and reducing its cost to the purchaser. This renders the machine peculiarly valuable as a coffee-separator, as coffee is grown in all parts of the tropical world, where machines of this class have to be transported long distances, in order to reach the user, while the means of transportation are mostly primitive and inadequate for bulky machinery.

The simple means adapted for securing the machine to a stationary support renders the lack of a frame-work no inconvenience to the purchaser, and enables the machine to be readily set up for use where occasion may require.

I claim as my invention—

1. As a new article of manufacture, a portable grain-separator composed of a shaking-shoe and blast-fan, and adapted to be secured to a stationary support by means substantially as specified, for the purpose set forth.

2. In a portable grain-separator, the fan-case C *d d*, constructed with arms E E attached to the side pieces of the fan-case, and adapted to be secured to a stationary support, substantially as and for the purpose set forth.

3. The combination, with the stationary fan and case D *d*, of the air-trunk B, straps *h*, and hinged leg I, substantially as and for the purpose set forth.

4. The combination, with the stationary fan D and side pieces *d d* of the fan-case, of the adjustable air-trunk B and fan-scroll *c* attached thereto, substantially as and for the purpose set forth.

5. The combination, with the stationary fan D and side pieces *d d* of the fan-case, of the shaking-shoe A, adjustable air-trunk B, fan-scroll *c* attached thereto, and straps *h*, substantially as and for the purpose set forth.

6. The combination, with the shaking-shoe A and stationary guide *l*, of the arm L and adjustable stop *m*, substantially as and for the purpose set forth.

7. The combination, with the shaking-shoe A and stationary guide *l*, of the arm L, adjustable stop *m*, fan D, and cam *k*, substantially as and for the purpose set forth.

8. The combination, with the fan D and cam *k*, of the trunk B, guide *l*, arm L, adjustable stop *m*, shoe A, and screens *n q r*, substantially as and for the purpose set forth.

9. The combination, with the fan and case D *d*, arms E, and cam *k*, of the trunk B, straps *h*, rod L, adjustable stop *m*, shoe A, and screens *n q r*, substantially as and for the purpose set forth.

H. B. STEVENS.

Witnesses:
 JNO. J. BONNER,
 EDWD. C. HAWKS.